US011084586B2

(12) United States Patent
Sheehan et al.

(10) Patent No.: US 11,084,586 B2
(45) Date of Patent: *Aug. 10, 2021

(54) INTERMITTENT FLUID DELIVERY SYSTEM

(71) Applicant: AERO SPECIALTIES, INC., Boise, ID (US)

(72) Inventors: Matthew Sheehan, Boise, ID (US); Derek Rose, Boise, ID (US); Paul Streufert, Boise, ID (US); Robert Byars, Boise, ID (US)

(73) Assignee: AERO SPECIALTIES, INC., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 16/686,814

(22) Filed: Nov. 18, 2019

(65) Prior Publication Data

US 2020/0189738 A1 Jun. 18, 2020

Related U.S. Application Data

(63) Continuation of application No. 15/782,784, filed on Oct. 12, 2017, now Pat. No. 10,513,337.

(60) Provisional application No. 62/415,047, filed on Oct. 31, 2016.

(51) Int. Cl.
| | |
|---|---|
| *B64D 11/02* | (2006.01) |
| *B64F 5/40* | (2017.01) |
| *E03F 1/00* | (2006.01) |
| *E03D 5/012* | (2006.01) |
| *E03D 5/02* | (2006.01) |
| *E03D 9/00* | (2006.01) |

(52) U.S. Cl.
CPC ............... *B64D 11/02* (2013.01); *B64F 5/40* (2017.01); *E03D 5/012* (2013.01); *E03F 1/008* (2013.01); *E03D 5/026* (2013.01); *E03D 9/00* (2013.01); *Y10T 137/86043* (2015.04); *Y10T 137/86196* (2015.04)

(58) Field of Classification Search
CPC ... E03D 9/00; E64D 11/02; Y10T 137/86043; Y10T 137/86196
See application file for complete search history.

(56) References Cited

U.S. PATENT DOCUMENTS

| | | |
|---|---|---|
| 2,064,799 A | 12/1936 | Jones |
| 3,490,482 A | 1/1970 | Sachs et al. |
| 3,570,503 A | 3/1971 | DeBoliac |
| 4,550,453 A | 11/1985 | Norman |
| 5,261,440 A | 11/1993 | Frank |
| 5,303,739 A | 4/1994 | Ellgoth et al. |

(Continued)

OTHER PUBLICATIONS

WO, PCT/US2017/058487 ISR and Written Opinion, dated Dec. 27, 2017.

*Primary Examiner* — Umashankar Venkatesan
(74) *Attorney, Agent, or Firm* — One LLP

(57) ABSTRACT

An intermittent fluid delivery system includes a fill tank and a batch tank which is connected to the fill tank via a first pump and a first hose. The fill tank holds a first quantity of fluid. The batch tank holds a second quantity of fluid, which is lesser than the first quantity. The first pump delivers fluid from the fill tank to the batch tank. A second pump delivers fluid from the batch tank to a receiving tank.

17 Claims, 7 Drawing Sheets

(56) References Cited

U.S. PATENT DOCUMENTS

| | | | |
|---|---|---|---|
| 6,402,945 B1 ‡ | 6/2002 | Swales | C02F 1/42 |
| | | | 137/1 |
| 7,331,365 B2 ‡ | 2/2008 | Nguyen | C02F 1/78 |
| | | | 210/195.1 |
| 8,043,500 B2 ‡ | 10/2011 | Murg | B01D 35/027 |
| | | | 137/1 |
| 2005/0126927 A1 ‡ | 6/2005 | Lindauer | C02F 1/4674 |
| | | | 205/743 |
| 2013/0298998 A1 ‡ | 11/2013 | Nolan | C02F 1/78 |
| | | | 210/192 |
| 2014/0261697 A1 ‡ | 9/2014 | Vaughan | F16K 15/181 |
| | | | 141/198 |

‡ imported from a related application

INTERMITTENT FLUID DELIVERY SYSTEM

CROSS-REFERENCE TO RELATED APPLICATIONS

The present application is a continuation of U.S. patent application Ser. No. 15/782,784, filed Oct. 12, 2017, which claims benefit of priority with U.S. Provisional Application No. 62/415,047, filed Oct. 31, 2016, both of which are incorporated herein by reference in their entireties for all purposes.

FIELD OF THE INVENTION

The present disclosure generally relates to an intermittent fluid delivery system, and more particularly, to an intermittent fluid delivery system that can prevent overfilling of an aircraft lavatory system.

BACKGROUND

Aircraft lavatory systems must be serviced regularly when the aircraft is on the ground. As shown in FIG. 1, aircraft lavatory systems 10 generally include one or more toilet bowls 20 connected to a waste storage tank 40, which stores bodily waste. The waste storage tank 40 is connected to a waste drain fitting (or coupling) 50 by a waste drain tube 30 for discharging waste, and a ground flush (or rinse) line 60 for filling the waste storage tank 40 with sanitizing fluid. Access to the waste drain fitting 50 and ground flush line 60 is provided through a service panel 70 located on an underside of the aircraft, as shown, for example, in FIG. 8.

During routine ground maintenance by ground service crews, the waste storage tank 40 is typically emptied and rinsed, and the sanitizing fluid is replenished. In this way, waste is drained from the waste storage tank 40 via the waste drain tube 30 and waste drain fitting 50, and sanitizing fluid is pumped back into the waste storage tank 40 via the ground flush (or rinse) line 60. The sanitizing fluid is pumped into the water storage tank 40 from a lavatory service truck or cart through a ground flush line connection 80, located in the service panel 70, coupled to the ground flush line 60. For purposes of this disclosure, sanitizing fluid, also referred to herein as "blue fluid" or "blue water," refers to a fluid with disinfectant chemicals that is mixed with water. This chemical water disinfects and breaks down waste solids.

Ground service crews must be careful not to overfill the waste storage tank with sanitizing fluid or water. When the waste storage tank is overfilled, the blue water or waste may overflow out of the toilet onto carpeting, finished surfaces, or fixtures inside the aircraft. When this happens, waste fluid may get under the floorboards, requiring maintenance personnel to remove floorboards for inspection and replace wiring or other components. There have been instances where ground service crews have overfilled the waste storage tank, causing damage to the aircraft flooring and other components that required the aircraft to be grounded. For example, in one instance a ground crew pumped 100 gallons of water into the water storage tank of a small plane that was designed to hold only 7 gallons of water. This resulted in over $130,000 of property damage, diminished the value of the aircraft by over $800,000, and caused the aircraft to be grounded for several days. Even a small amount of overfill, for example, an overfill of between 1 to 5 gallons could cost up to $40,000 to repair, not including re-inspection fees. Cost to repair larger commercial aircraft due to overfill may be significantly larger. In addition, each hour of down time may cost a commercial airline close to $6,000.

There is presently no industry accepted standard, or preventative hardware or software program for monitoring overfill of aircraft lavatory systems. Some manufacturers of the servicing equipment provide guides and placards to assist the ground crew operators in knowing the proper quantities of fluids to service lavatory systems. However, the procedures must be carefully followed and monitored. Moreover, the ground service crews often comprise new hires that exacerbate the problems. On the other hand, aircrafts must be adapted if new hardware and software are to be installed to avoid overfill problems. The costs are prohibitive.

Absent human errors from ground service crews, components in lavatory filling systems may still fail due to contact with the chemical water overtime. For example, lavatory filling systems often rely on meters that may provide faulty readings, thus causing overfills. Studies have shown that the leading and most costly cause of aircraft lavatory overfill damage is directly related to fluid meter systems. These metering systems commonly use a mechanical wheel or rotating disc-type meters to measure fluid flow. As the fill fluid (i.e., blue water) is pumped through these meters, it actuates the gear, wheel or disc by contact with the fluid. The lavatory treatment additives and/or chemicals added to the fill fluid are somewhat sticky in nature and widely known to damage the metering mechanism. The sticky fluid may case the meter to undercount or not count the fluid being pumped onboard the aircraft. Pumping systems on these vehicles or carts deliver as little as 2 GPM (gallons per minute), and as much as 25 GPM. Therefore, in an example where only 3 gallons of sanitizing fluid is required to be added in a corporate aircraft application, it may only take a minute or two to overfill a waste storage tank.

A need therefore exists for an intermittent fluid delivery system for use in aircraft lavatory filling system that can substantially prevent overfilling, an advantage heretofore unknown in the art.

SUMMARY OF THE INVENTION

An intermittent fluid delivery system is disclosed. In one example, the intermittent fluid delivery system is an aircraft lavatory filling system that includes a fill tank and a batch tank that is connected to the fill tank via a first pump and a first hose. The fill tank is sized to hold a first quantity of fluid. The batch tank is sized to hold a second quantity of fluid, wherein the second quantity is limited in volume and is lesser than the first quantity. The first pump delivers fluid from the fill tank to the batch tank. A second pump delivers fluid from the batch tank to an aircraft onboard tank. As a result, the disclosed aircraft lavatory filling system does not pump fluid directly into the aircraft, but rather into a batch tank. When the batch tank is filled, the aircraft lavatory filling system delivers the fluid to the aircraft out of the batch tank in batches of limited quantity, until the aircraft holding tank is filled to the desired capacity. To prevent operator error, the pumps are activated only when a provided power switch is held in predetermined positions.

In a second example, the intermittent fluid delivery is an aircraft lavatory filling system that may include a fill tank and two batch tanks. In this example, the first batch tank may be connected to the fill tank via a first pump and a first hose and the second batch tank may be connected to the fill tank via a second pump and a second hose. The fill tank is sized to hold a first quantity of fluid. The first batch tank and the second batch tank are each sized to hold a second quantity of fluid, wherein the second quantity is limited in volume and is lesser than the first quantity.

Other devices, apparatus, systems, methods, features and advantages of the disclosure will be or will become apparent to one with skill in the art upon examination of the following figures and detailed description. It is intended that all such additional systems, methods, features and advantages be included within this description, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

FIGS. 2-8 illustrate examples of various embodiments of an intermittent fluid delivery system used, for example, in an aircraft lavatory filling system according to the teachings of the present disclosure. For brevity, the intermittent fluid delivery system used, for example, in an aircraft lavatory filling system will be referred to below as an aircraft lavatory system. However, it should be noted that the intermittent fluid delivery system may also be used in other applications to prevent overfill. Generally, the aircraft lavatory filling system may include a fill tank and at least one batch tank. A batch pump delivers fluid from the fill tank to the batch tank, or batch tanks. A second pump delivers fluid from the batch tank, or batch tanks, to a receiving system, for example, an aircraft onboard tank. In embodiments with dual batch tanks, one batch tank may receive and hold clear water; and the other batch tank may receive and hold clear water and sanitizing agents. As a result, the disclosed aircraft lavatory filling system does not pump fluid directly into the aircraft (e.g., directly into the aircraft onboard tank), but rather into a batch tank. When the batch tank is filled, the disclosed aircraft lavatory filling system delivers the fluid to the aircraft out of the batch tank in batches of limited quantity, until the aircraft holding tank is filled to the desired capacity. For purposes of the present disclosure, a "sanitizing agent" shall mean any type of concentrated sanitizing chemical or additives used to treat water stored in the fill tank, including, for example, "Lav Chem Blue" blue lavatory treatment fluid, "Lav Chem Clear" clear lavatory treatment fluid, and "Sani-Pak Aircraft Lavatory Sanitizer-Deodorant" powder manufactured by Aero Specialties, Inc., Boise, Id., "Blue Juice® LavFluid" manufactured by Orison Marketing, LLC, Abilene, Tex., or "Clean Flush" flushing fluid or powder manufactured by Aircraft Technologies, Inc., San Antonio, Tex. For purposes of the present disclosure, a "sanitizing fluid" shall refer to chemical solution of water and one or more sanitizing agents.

Figure 1:
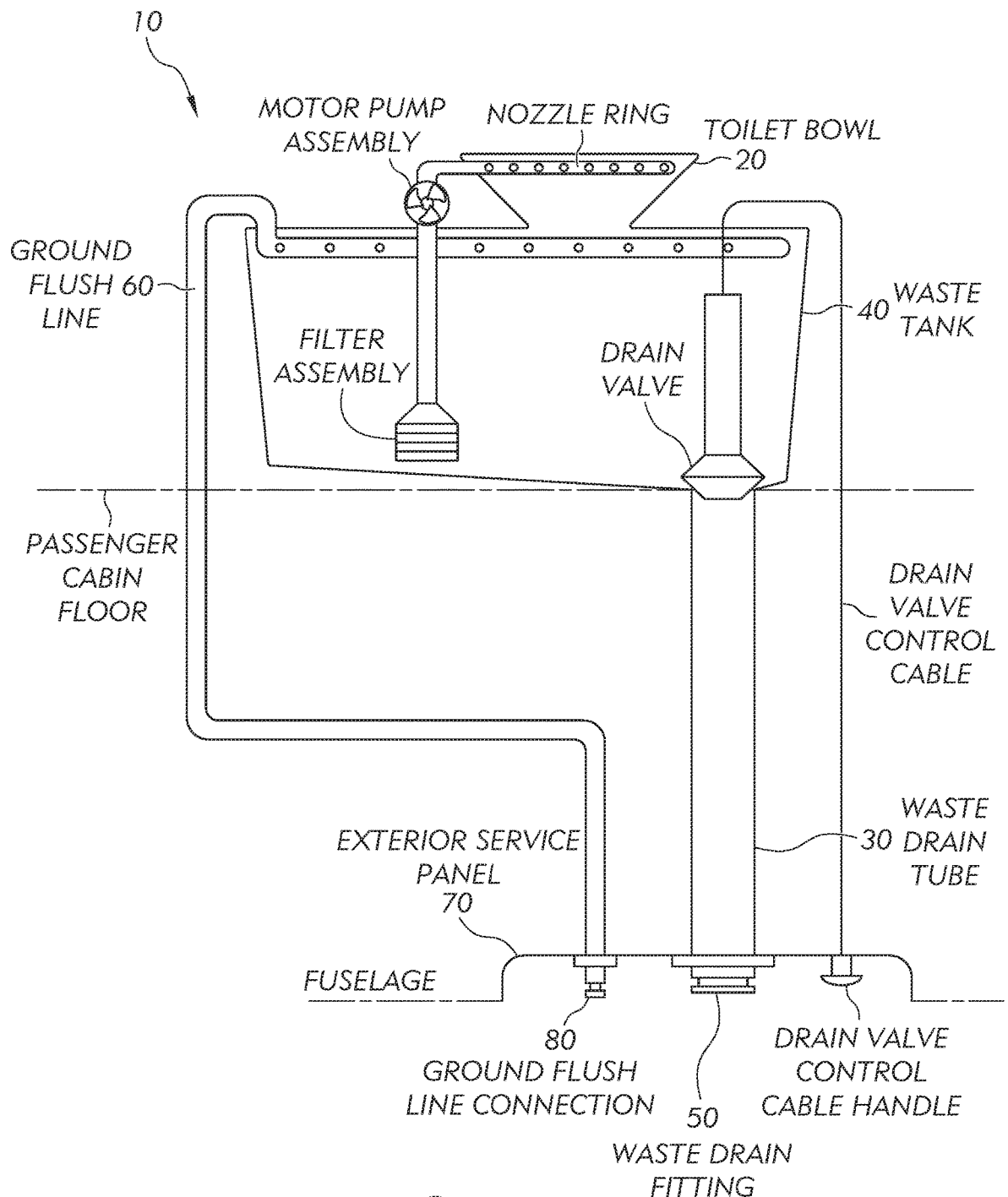
FIG. 1 illustrates a schematic diagram of an exemplary prior art aircraft lavatory system.
Figure 2:
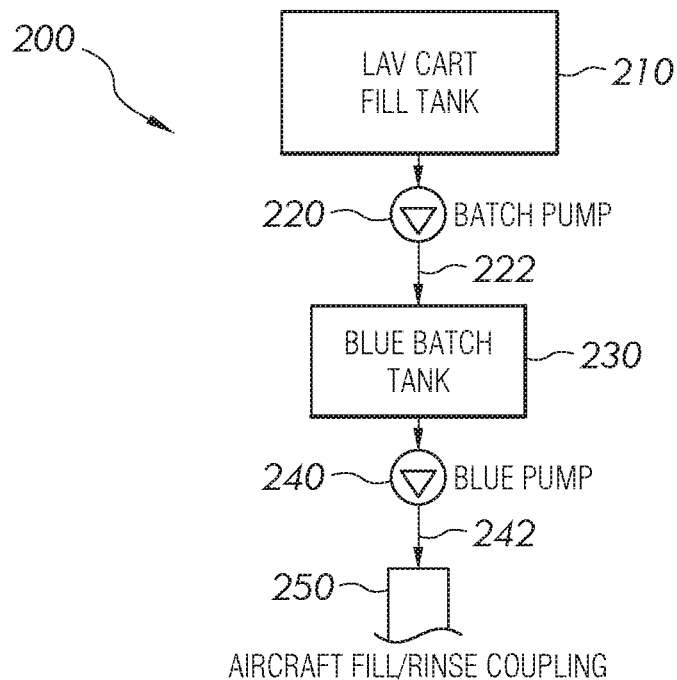
FIG. 2 illustrates a schematic diagram of an aircraft lavatory filling system with a single batch tank according to an example embodiment of the present disclosure.

FIG. 2 is a schematic diagram illustrating an example embodiment of an intermittent fluid delivery system used, for example, in an aircraft lavatory filling system 200 according to the teachings of the present disclosure. The aircraft lavatory filling system 200 as illustrated is a single batch or batching tank filling system. In some embodiments, the aircraft lavatory filling system 200 may be installed on an aircraft lavatory service cart (see, for example, FIG. 4), or other suitable vehicle or mobile transport.

The aircraft lavatory filling system 200 may include a fill tank 210 and a batch tank 230. The fill tank 210 may hold, for example, approximately 16 to 250 gallons of water or sanitizing fluid on a service cart, or approximately 100 to 500 gallons on a service truck. The fill tank 210 may be constructed of plastic, aluminum, stainless steel, or other non-corrosive material.

The batch tank 230 may hold a lesser, limited amount of fluid, for example, up to 3 gallons of water or sanitizing fluid. The batch tank 230 may be constructed of plastic, aluminum, stainless steel, or other non-corrosive material.

In applications where the aircraft lavatory system 200 uses blue water, a blue lavatory chemical or any other suitable sanitizing fluid, such as, for example, "Lav Chem Blue" blue lavatory treatment fluid or "Sani-Pak Aircraft Lavatory Sanitizer-Deodorant" powder manufactured by Aero Specialties, Inc., Boise, Id., may be added and mixed with water in the fill tank 210. A first pump 220 (which may be called a batch pump) pumps water or sanitizing fluid, via a first fluid line 222, from the fill tank 210 to the batch tank 230. In some embodiments, the batch tank 230 may hold up to 3 gallons of fluid. A second pump 240 (which may be called a blue pump) pumps fluid, via a second fluid line 242, from the batch tank 230 to a tank rinse line coupling 250 coupled to an aircraft service panel (see, for example, FIG. 8). The tank rinse line pumps the fluid to a waste storage tank located onboard the aircraft. The arrows illustrated in FIG. 2 indicate the flow of fluid through the various system components. The first and second pumps 220 and 240 may be electric, gas, air, hand pump, or any suitable pump known in the art. It should be noted that in applications where the aircraft lavatory system 200 does not require blue water, sanitizing fluid is not added to the fill tank 210.

In some exemplary operations, a ground crew operator may fill the fill tank 210 with clear water, and then add an appropriate amount of blue sanitizing agent to the water in, for example, a 400:1 or 500:1 ratio, to form a sanitizing fluid (i.e., blue water). In some embodiments, the sanitizing agent may be added to the fill tank 210 through an access fill port. The access fill port may be the same port used to fill the fill tank 210 with water, for example, at an airport terminal or a hangar. The fill tank 210 may also have an access lid or opening to receive the sanitizing agent. When adding sanitizing agent in fluid form, the operator may measure and add the sanitizing agent per recommendation of the manufacturer of the sanitizing agent. In some exemplary operations, the sanitizing agent may be powder which comes in pre-packaged pouches that are sized appropriate to the capacity of the fill tank 210. After forming the sanitizing fluid, the operator may then operate the pump 220 (described further in FIG. 6) to fill the batch tank 230 with the sanitizing fluid from the fill tank 210. In some embodiments, the batch tank 230 may be filled with up to 3 gallons of fluid.

In some other exemplary operations, an operator may add sanitizing agent directly to the batch tank 230.

Once the batch tank 230 is filled, the operator may next activate the pump 240 to deliver fluid from the batch tank 230 to the waste storage tank located onboard the aircraft. The operator may repeat the above steps—transporting water or sanitizing fluid at increments of, for example, up to 3 gallons of water or sanitizing fluid at a time—until the lavatory tank onboard the aircraft is filled to a desired level.

In some embodiments, the batch tank 230 may be sized to a particular aircraft's fill quantity, making the operation simple and transparent for the operator. For example, most small (e.g., 3-5 seats) and larger (e.g., 6-15 seats) private jets have a maximum fill capacity of 2.5 to 3 gallons. In these cases, a 3-gallon batch tank 230 may be used. In other examples, regional aircrafts have a 7 to 15 gallons fill capacity, thus, a larger (e.g., 15-gallon) batch tank 230 may be used. Other tank sizes may also be used.

With these batching steps, the aircraft lavatory filling system 200 may allow only the batch-tank quantity of fluid to be delivered to the lavatory tank onboard the aircraft, thus, blocking direct access to the fill tank 210, which holds a larger quantity of water or sanitizing fluid, during the delivery of fluid to the aircraft. The batching steps help prevent overfilling of the waste storage tank located onboard the aircraft. It should also be noted that the aircraft lavatory filling system 200 advantageously eliminates the use of fill meters and their associated problems.

Figure 3:
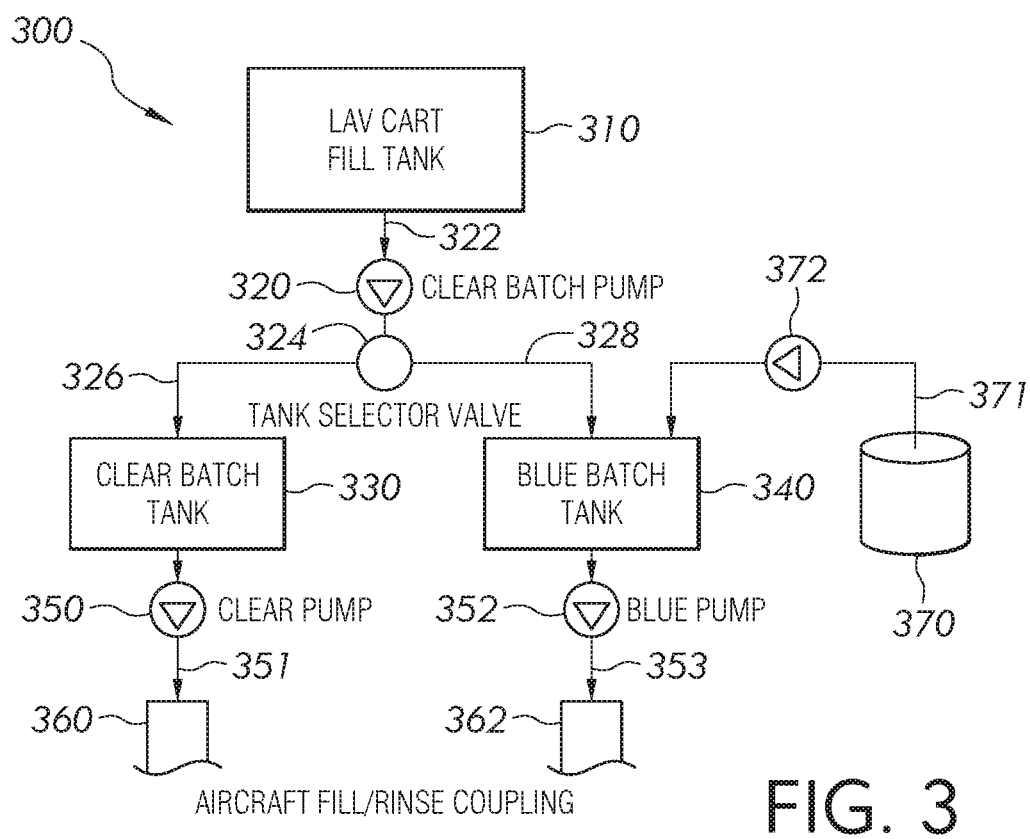
FIG. 3 illustrates a schematic diagram of an aircraft lavatory filling system with dual batch tanks according to an example embodiment of the present disclosure.

FIG. 3 is a schematic diagram illustrating a second example embodiment of an intermittent fluid delivery system used, for example, in an aircraft lavatory filling system 300 according to the teachings of the present disclosure. The aircraft lavatory filling system 300 in this example is a dual batch or batching tank filling system. In some embodiments, the aircraft lavatory filling system 300 may be installed on an aircraft lavatory service cart, or other suitable vehicle or mobile transport.

The aircraft lavatory filling system 300 may include a larger fill tank 310 and two, smaller batch tanks 330 and 340. The fill tank 310 may hold, for example, approximately 16 to 250 gallons of clear water on a service cart, or approximately 100 to 500 gallons on a service truck. The fill tank 310 may be constructed of plastic, aluminum, stainless steel, or other non-corrosive material.

The first batch tank 330 (clear water batch tank) may be used to hold clear water. The second batch tank 340 (blue water batch tank) may be used to hold blue water. The first and second batch tanks 330 and 340 may be constructed of plastic, aluminum, stainless steel, or other non-corrosive material.

In use, a first pump 320 pumps water, via a first fluid line 322, from the fill tank 310 to either the first batch tank 330 or the second batch tank 340. A switch, in the form of a tank selector valve 324, may be used to select whether the first batch tank 330 (via hose 326) or second batch tank 340 (via hose 328) receives water from the fill tank 310. The selector valve 324 may be a three-way selector/diverter valve known in the art. In some embodiments, the selector valve 324 may be manual and operated manually using a selection handle. In other embodiments, the selector valve 324 may be activated electrically, or activated with pneumatic or hydraulic pressure.

A second pump 350 (which may be called a clear pump) pumps water, via a second fluid line 351, from the first batch tank 330, through tank rinse line coupling 360, to a waste storage tank located onboard an aircraft. A third pump 352 (which may be called a blue pump) pumps water, via a third fluid line 353, from the second batch tank 340, through tank rinse line coupling 362, to the waste storage tank located onboard the aircraft. The arrows illustrated in FIG. 3 indicate the flow of fluid among the various components. The pumps 320, 350 and 352 may be electric, gas, air, hand pump, or any suitable pump as known in the art.

In some embodiments, the aircraft lavatory filling system 300 may include a tank 370 coupled to the second batch tank 340 via fluid line 371. In this example, the tank 370 may be used to store concentrated blue sanitizing agents. A fourth pump 372 coupled to fluid line 371 may be used to pump a desired amount of sanitizing agents into the second batch tank 340 (as shown) to form a sanitizing fluid. Thus, in the example shown, the second batch tank 340 may hold blue water. The fourth pump 372 may be electric, gas, air, hand pump, or any suitable pump as known in the art. However, as the amount of sanitizing agents needed to concentrate the water in the batch tank 340 is usually small, for example, 1-2 fluid ounces for 3 gallons of water, the pump 372 may more suitably be a hand pump in order to avoid overfilling the batch tank 340 with sanitizing agents.

In some exemplary operations, clear water stored in the first (clear water) batch tank 330 may be used to rinse an aircraft lavatory system before the blue water in the second (blue water) batch tank 340 is used to re-fill the aircraft lavatory system. In applications where the aircraft lavatory system does not require blue sanitizing water, only water from the first batch tank 330 may be used. It should also be noted that the aircraft lavatory filling system 300 advantageously eliminates the use of fill meters and their associated problems.

Figure 4:
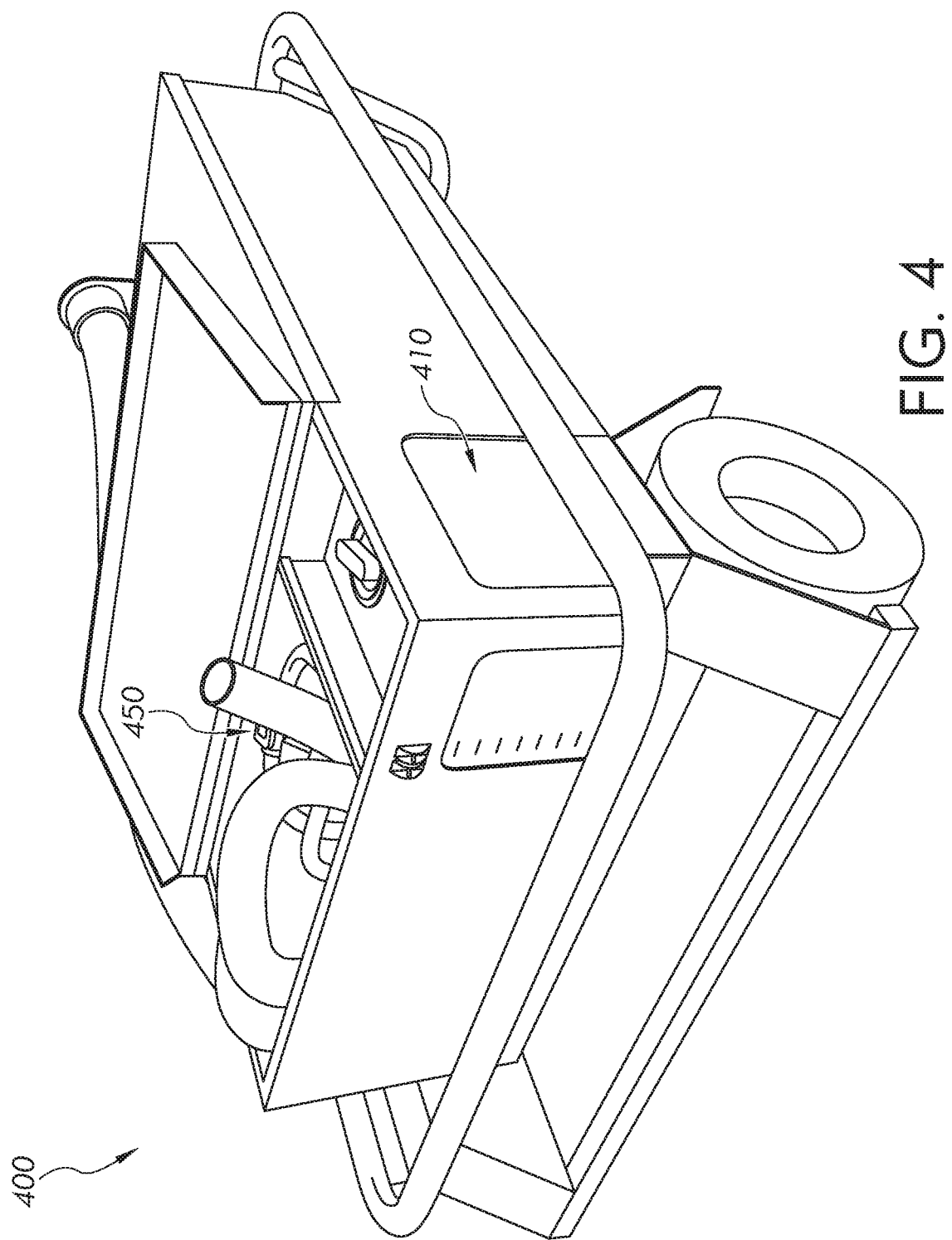
FIG. 4 illustrates a perspective view of an exemplary aircraft lavatory service cart housing an aircraft lavatory filling system according to an embodiment of the present disclosure.

FIG. 4 is a perspective view of an example of one implementation of an aircraft lavatory service cart 400 transporting an aircraft lavatory filling system 450 according to the teachings of the present disclosure. In the example shown, the aircraft lavatory filling system 450 is utilizes a single batch tank 410 located near the rear of the cart 400. In present example, the aircraft lavatory service cart 400 includes an aluminum casing, a 70-gallon (265 liter) fill/flush tank (not visibly shown as it is enclosed in the aluminum case) holding an immersion heater (not visibly shown) for insurance against frozen blue lavatory fluid, and a 110-gallon (416.4 liter) waste tank (not visibly shown). In other implementations, the aircraft lavatory service cart 400 may be made of any non-corrosive material, constructed to any dimension, and include additional components and features. In the example lavatory service cart 400 shown, the pump, waste valve, and fill hoses are positioned in an insulated and heated rear compartment, as will be described in more detail below. The example aircraft lavatory service cart 400 shown is sized for corporate aircraft lavatory systems and features a low-profile design with, for example, a 22-inch inlet and 9-inch gravity waste outlet, which is ideal for servicing corporate and regional aircraft. The low-profile deck height of the service cart in this example is low enough for servicing business and regional jets but also provides plenty of height for servicing larger jets. In commercial aircraft applications, the aircraft lavatory filling system 450 may be transported on a truck and the tanks, pumps, valves, hoses, and other components may be constructed to larger dimensions.

Figure 5:
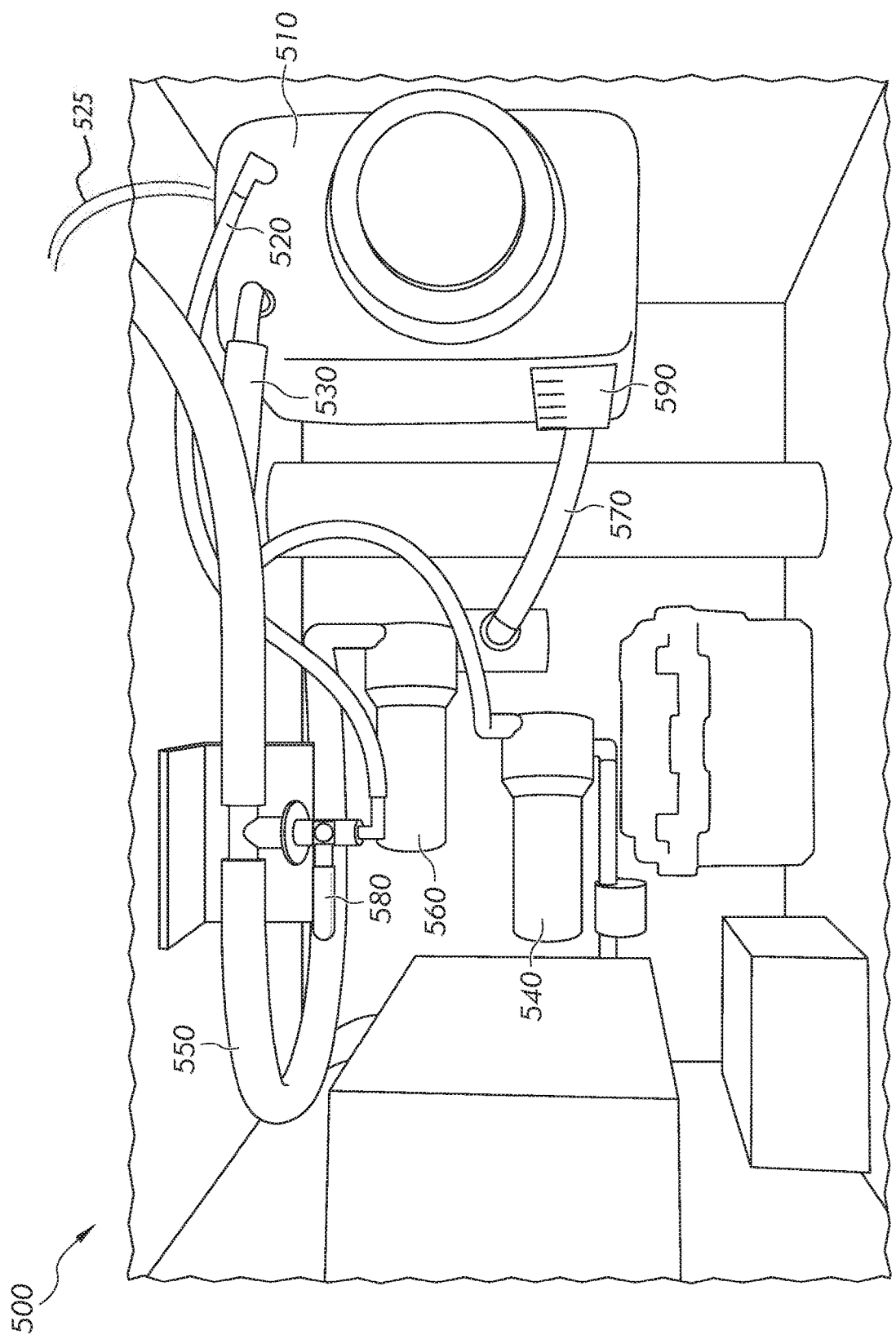
FIG. 5 illustrates a partial top view of an exemplary aircraft lavatory filling system located in an exemplary aircraft lavatory service cart illustrated in FIG. 4 in accordance with an embodiment of the present invention.

FIG. 5 is a partial top view of an example embodiment of an aircraft lavatory filling system 500 of the present disclosure. As shown, the aircraft lavatory filling system 500 may be installed in an aircraft lavatory service cart similar to the aircraft lavatory service cart 400 described in FIG. 4. In this example, the aircraft lavatory filling system 500 is a single batch tank filling system having a batch tank 510. The batch tank 510 may be constructed of plastic or any other durable, transparent or translucent material.

Figure 8:
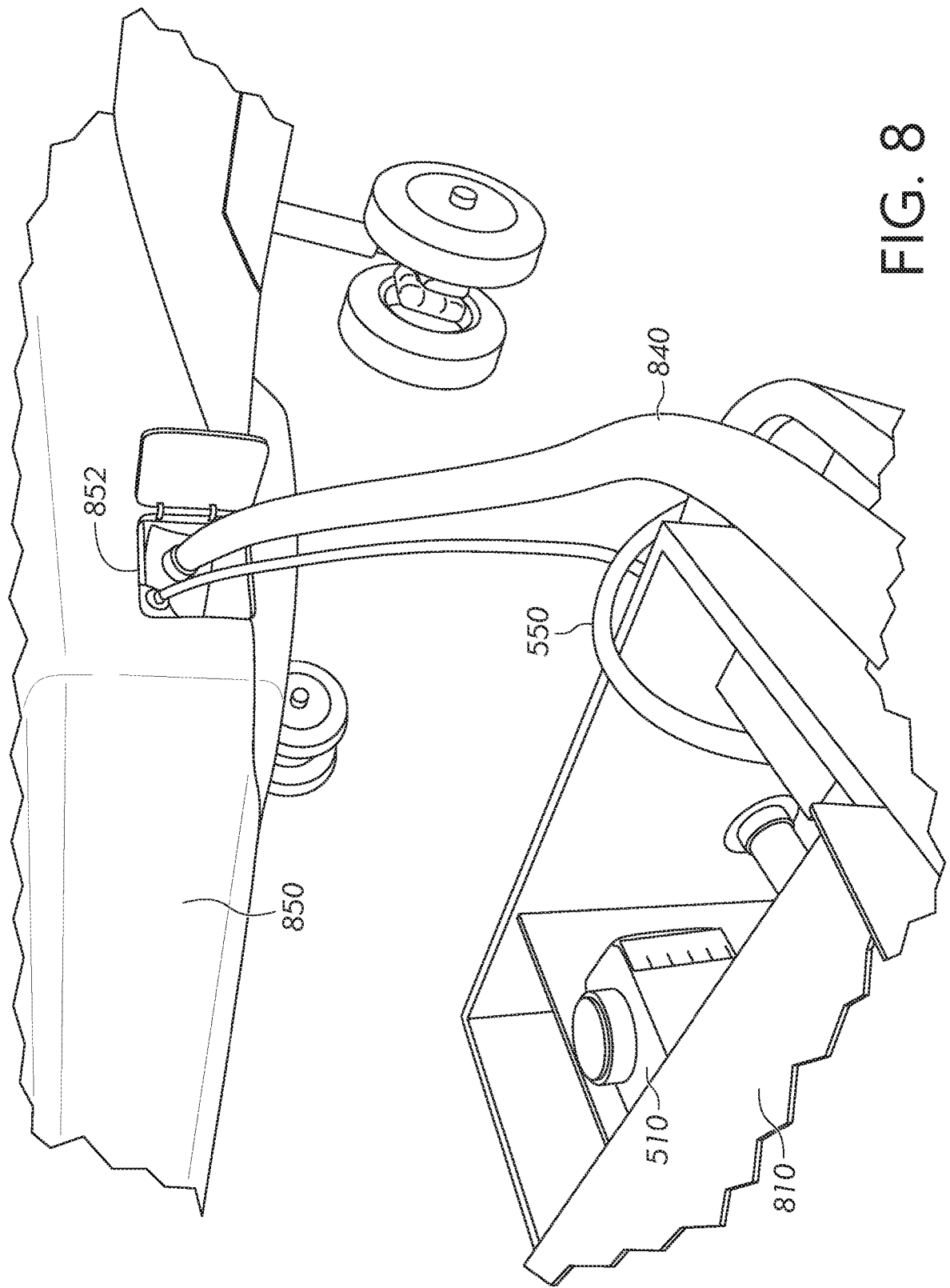
FIG. 8 is a perspective view illustrating an exemplary operation set-up of an aircraft lavatory filling system being used to service an aircraft according to an example embodiment of the present disclosure.

As shown, a first pump 540 pumps water or sanitizing fluid from a fill tank (not shown) to the batch tank 510 via hose 530. In some embodiments, the batch tank 510 may hold up to 3 gallons of fluid. The batch tank 510 includes an overfill hose 520. In the event that an operator accidentally overfills the batch tank 510, the overfill fluid will drain through the overfill hose 525, for example, back into the fill or main tank (not shown). A second pump 560 pumps the water or sanitizing fluid from the batch tank 510 to a lavatory tank located in an aircraft via hose 570 (connecting from the batch tank (510 to the pump 560) and hose 550 (connecting from the pump 560 to an aircraft service panel, as shown in FIG. 8). A level marker 590 may be provided for visual indication of the fluid level in the batch tank 510.

The aircraft lavatory filling system 500 may also include a drain-back valve 580 to release pressure in the hose 550. During the filling of fluid to the aircraft, the hose 550 may stay under pressure. To prevent pressurized fluid from spilling when an operator disconnects the hose 550 from the aircraft, the drain-back valve 580 serves to release the pressure built-up in the hose line before the operator disconnects the hose 550. When opened, the drain-back valve 580 releases hose pressure, and the fluid in the fill hose 550 is directed back into the batch tank 510. This prevents the fluid from spilling, for example, on the operator, the hangar floor, or the ramp.

Figure 6:
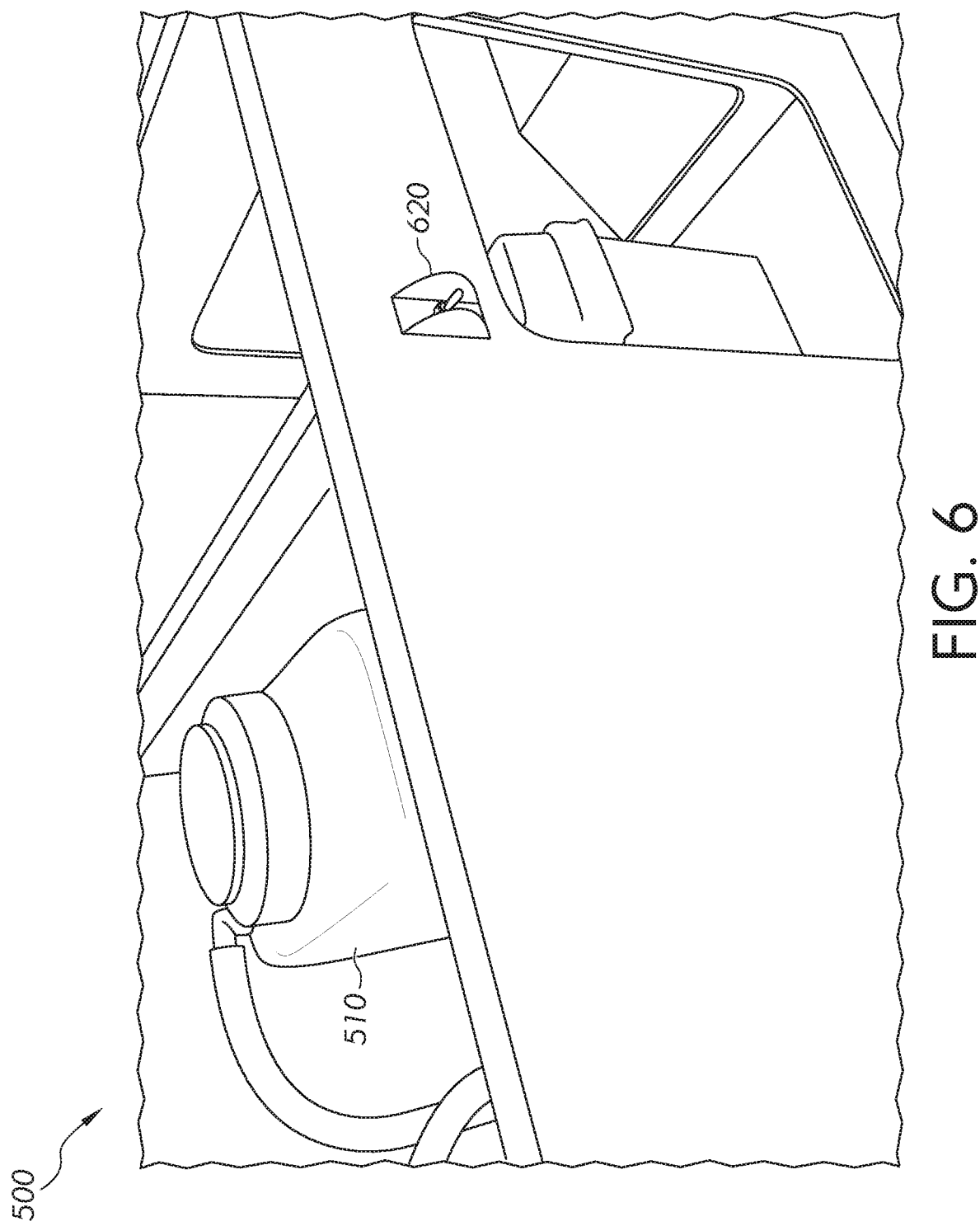
FIG. 6 illustrates a partial side view of an exemplary power switch for an aircraft lavatory filling system located in an exemplary aircraft lavatory service cart illustrated in FIG. 4 in accordance with an embodiment of the present invention.

FIG. 6 is a partial side view of the aircraft lavatory filling system 500, illustrating one example of a power switch 620 used to power the aircraft lavatory filling system. In some embodiments, the power switch 620 may be spring loaded to generally remain in an unbiased, neutral position. When an operator holds or biases the switch 620 in a first direction, for example, downward from the neutral position, the pump 540 is activated and pumps water or sanitizing fluid from the fill tank to the batch tank 510. In some embodiments, the pump 540 runs only when the switch 620 is being held in the first (e.g., downward) position. The pump 540 stops when the operator releases, or let's go off, the switch 620, which returns to the neutral position. When the operator holds the switch 620 in a second position, for example, upward from the neutral position, the pump 560 is activated and pumps water or sanitizing fluid from the batch tank 510 to the aircraft lavatory system. In some embodiments, the pump 560 runs only when the switch 620 is being held in the second (e.g., upward) position. The pump 560 stops when the operator releases, or let's go off, the switch 620, which returns to the neutral position.

Referring back to FIG. 3, in a dual batch tank system, separate pump switches may be provided to operate pumps 320, 350, 352, and 372 respectively. These switches may be clearly labeled, for example, to indicate which particular tank and hose a switch controls or operates.

Also in a dual batch tank system, each batch tank includes an overfill hose.

Figure 7B:
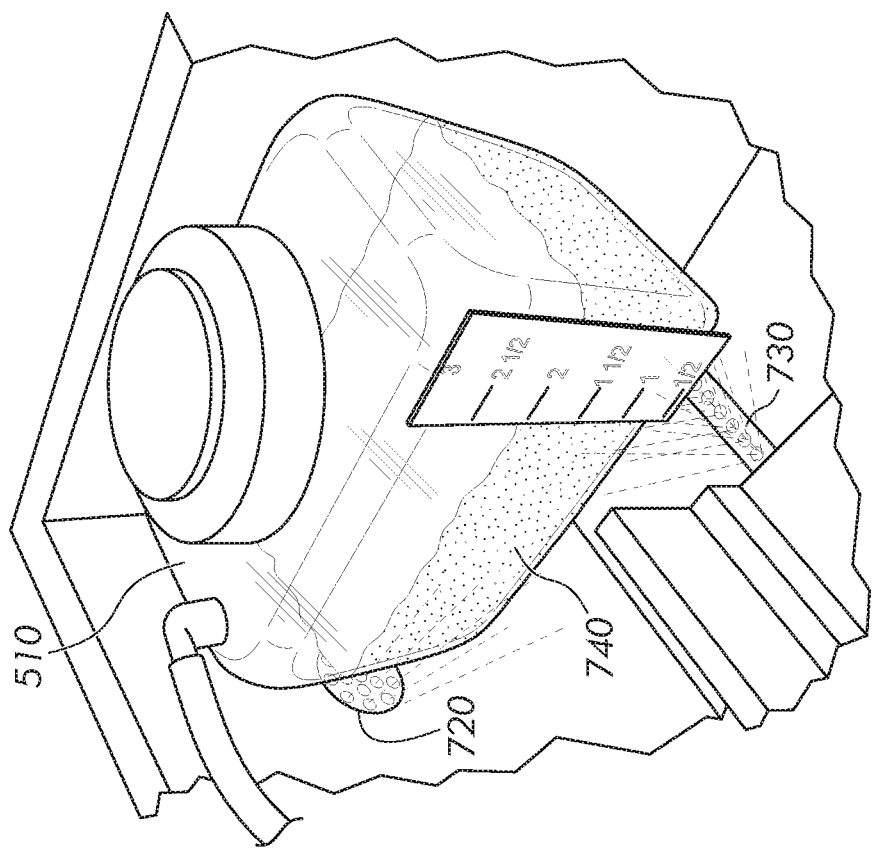
FIG. 7B illustrates another perspective view of an exemplary back lit batch tank according to an example embodiment of the present disclosure.
Figure 7A:
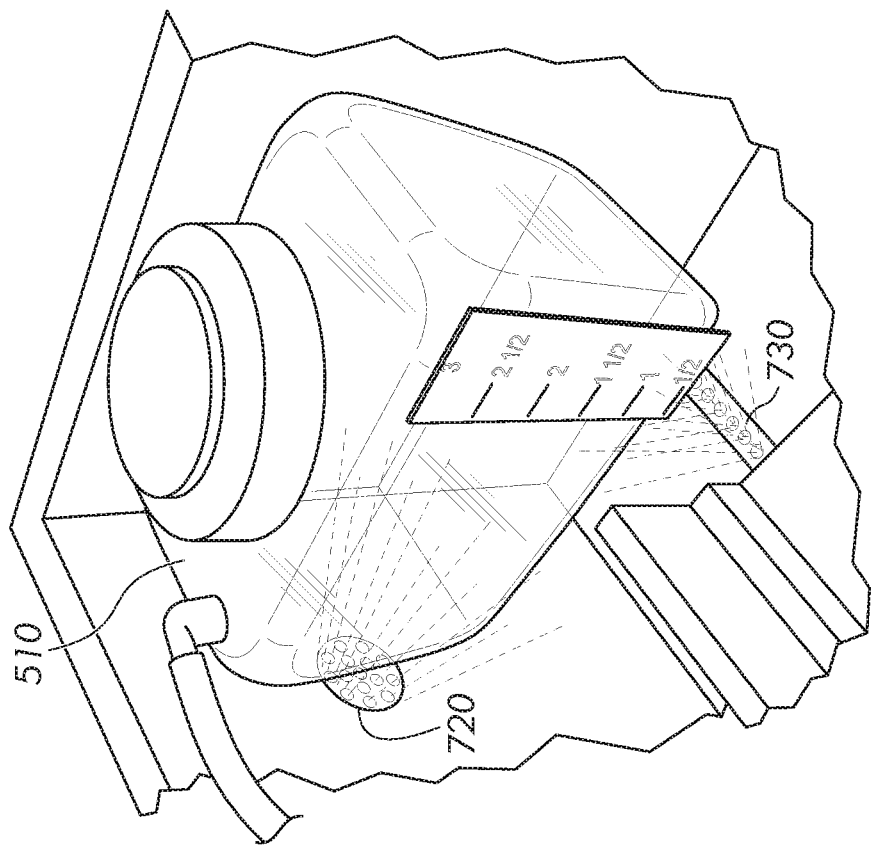
FIG. 7A illustrates a perspective view of an exemplary back lit batch tank according to an example embodiment of the present disclosure.

Turning now to FIGS. 7A and 7B, in some example embodiments, to avoid visibility issues when servicing at night, a batch tank, such as the batch tank 510 and level marker 590 may be backlit with lights 720 and 730, making the level marker 590 and the fluid in the batch tank 510 easily visible. The lights 720 and 730 may use any lighting known in the art to provide adequate illumination. FIG. 7A shows the batch tank 510 being empty. FIG. 7B shows the batch tank 510 with blue water 740 made visible when the batch tank 510 is backlit.

FIG. 8 illustrates an exemplary operation set-up where the aircraft lavatory filling system 500 is used to service an aircraft 850. As shown, the hose 550 is hooked up to an aircraft coupling at an aircraft service panel 852 to deliver water or sanitizing fluid to the aircraft lavatory system (not shown). A hose 840 is hooked up to second aircraft coupling at the aircraft service panel 852 to release waste from the aircraft lavatory system.

Although the embodiments described herein are particularly suited for servicing aircraft lavatory systems, the invention can be used for filling or re-filling any fluid system using small batches of fluid in general, without the need for meters. The invention may also be used on caustic-corrosive materials that would require meters built from more exotic materials.

In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Although the above description illustrates particular examples of various implementations, the present disclosure is not limited to the foregoing illustrative examples. A person skilled in the art is aware that the disclosure as defined by the appended claims and their equivalents can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A mobile aircraft lavatory filling system, comprising:
a fill tank sized to hold a first quantity of fluid; and
a batch tank coupled to the fill tank via a first pump and a first hose;
wherein the batch tank is sized to hold a second quantity of fluid that is less than the first quantity and is intermittently delivered from the batch tank to an aircraft lavatory system onboard an aircraft; and
wherein the batch tank includes an overfill hose for draining back to the fill tank any fluid overfilling the batch tank.

2. The aircraft lavatory filling system of claim 1, wherein the second quantity is configured for a lavatory tank of the aircraft.

3. The aircraft lavatory filling system of claim 2 further comprising a second pump and a second hose for delivering the second quantity of fluid from the batch tank to the aircraft lavatory system.

4. The aircraft lavatory filling system of claim 3 further comprising a power switch to activate the first pump when the power switch is being continuously held in a first position.

5. The aircraft lavatory filling system of claim 4, wherein the power switch activates the second pump when the power switch is being continuously held in a second position.

6. The aircraft lavatory filling system of claim 1, wherein the batch tank includes an apparatus for measuring the fluid level in the batch tank.

7. The aircraft lavatory filling system of claim 1, wherein the batch tank includes a device for illuminating the batch tank.

8. The aircraft lavatory filling system of claim 3 further includes a valve for relieving pressure buildup in the second hose.

9. A mobile aircraft lavatory filling system, comprising:
a fill tank sized to hold a first quantity of fluid;
the fill tank connected to a first pump and a selector valve and a first hose;
a first batch tank connected to the selector valve and a second hose;
a second batch tank connected to the selector valve and a third hose; and
wherein the first batch tank and the second batch tank is each sized to hold a second quantity of fluid, the second quantity is limited in volume less than the first quantity; and
wherein the first batch tank and the second batch tank each includes a respective overfill hose.

10. The aircraft lavatory filling system of claim 9, wherein the second quantity is less than the first quantity configured for a limit of a lavatory tank of an aircraft.

11. The aircraft lavatory filling system of claim 10 further includes a second pump and a fourth hose for delivering fluid from the first batch tank to an aircraft lavatory system.

12. The aircraft lavatory filling system of claim 11 further includes a third pump and a fifth hose for delivering fluid from the second batch tank to the aircraft lavatory system.

13. The aircraft lavatory filling system of claim 12, wherein the first batch tank holds clear water.

14. The aircraft lavatory filling system of claim 12, wherein the second batch tank holds sanitizing water.

15. The aircraft lavatory filling system of claim 14 further includes a fourth tank for holding concentrated sanitizing additives.

16. The aircraft lavatory filling system of claim 15 further includes a fourth pump for pumping a desired amount of concentrated sanitizing additives from the fourth tank into the second batch tank.

17. A mobile intermittent fluid delivery system, comprising:
a fill tank sized to hold a first quantity of fluid;
a batch tank coupled to the fill tank via a first pump and a first hose; and
wherein the batch tank is sized to hold a second quantity of fluid that is less than the first quantity and configured for a limit of a lavatory tank of an aircraft, and wherein a second pump and a second hose are coupled to the batch tank for intermittently delivering the second quantity of fluid from the batch tank to the lavatory tank of the aircraft; and
wherein the batch tank includes an overfill hose for draining back to the fill tank any fluid overfilling the batch tank.

* * * * *